(12) United States Patent
Guo

(10) Patent No.: US 8,392,376 B2
(45) Date of Patent: Mar. 5, 2013

(54) SYSTEM AND METHOD FOR SCALABLE REFERENCE MANAGEMENT IN A DEDUPLICATION BASED STORAGE SYSTEM

(75) Inventor: Fanglu Guo, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 122 days.

(21) Appl. No.: 12/875,815

(22) Filed: Sep. 3, 2010

(65) Prior Publication Data

US 2012/0059800 A1 Mar. 8, 2012

(51) Int. Cl.
*G06F 7/00* (2006.01)
*G06F 17/00* (2006.01)

(52) U.S. Cl. ......... 707/664; 707/800; 711/112; 711/162

(58) Field of Classification Search .......... 707/640, 707/664, 726, 800, E17.011, 999.204, 795, 707/E17.007; 711/111, 112, 162, E12.019
See application file for complete search history.

(56) References Cited

U.S. PATENT DOCUMENTS

| | | | |
|---|---|---|---|
| 5,537,652 A * | 7/1996 | Friedl et al. ................. | 711/111 |
| 5,555,391 A * | 9/1996 | De Subijana et al. ......... | 711/113 |
| 5,561,421 A | 10/1996 | Smith | |
| 5,990,810 A | 11/1999 | Williams | |
| 6,014,676 A | 1/2000 | McClain | |
| 6,141,784 A | 10/2000 | Davis | |
| 6,292,795 B1 * | 9/2001 | Peters et al. ............ | 707/999.001 |
| 6,389,433 B1 | 5/2002 | Bolosky et al. | |
| 6,513,051 B1 | 1/2003 | Bolosky et al. | |
| 6,785,786 B1 | 8/2004 | Gold et al. | |
| 6,865,655 B1 | 3/2005 | Andersen | |
| 6,920,537 B2 | 7/2005 | Ofek et al. | |
| 6,983,365 B1 | 1/2006 | Douceur et al. | |
| 7,055,008 B2 | 5/2006 | Niles | |
| 7,136,976 B2 | 11/2006 | Saika | |
| 7,146,429 B2 | 12/2006 | Michel | |
| 7,200,604 B2 | 4/2007 | Forman et al. | |
| 7,213,158 B2 | 5/2007 | Bantz et al. | |
| 7,257,104 B2 | 8/2007 | Shitama | |

(Continued)

OTHER PUBLICATIONS

Michael Vrable, Stefan Savage, and Geoffrey M. Voelker—"Cumulus: Filesystem backup to the cloud"—ACM Transactions on Storage, vol. 5, No. 4, Article 14, Publication date: Dec. 2009. pp. 1-28.*

(Continued)

*Primary Examiner* — Anh Ly
(74) *Attorney, Agent, or Firm* — Rory D. Rankin; Meyertons, Hood, Kivlin, Kowert & Goetzel, P.C.

(57) ABSTRACT

A system and method for managing a resource reclamation reference list at a coarse level. A storage device is configured to store a plurality of storage objects in a plurality of storage containers, each of said storage containers being configured to store a plurality of said storage objects. A storage container reference list is maintained, wherein for each of the storage containers the storage container reference list identifies which files of a plurality of files reference a storage object within a given storage container. In response to detecting deletion of a given file that references an object within a particular storage container of the storage containers, a server is configured to update the storage container reference list by removing from the storage container reference list an identification of the given file. A reference list associating segment objects with files that reference those segment objects may not be updated response to the deletion.

20 Claims, 11 Drawing Sheets

U.S. PATENT DOCUMENTS

| | | | |
|---|---|---|---|
| 7,257,643 B2 | 8/2007 | Mathew | |
| 7,310,644 B2 | 12/2007 | Adya et al. | |
| 7,318,072 B2 | 1/2008 | Margolus | |
| 7,359,920 B1 | 4/2008 | Rybicki et al. | |
| 7,389,394 B1 | 6/2008 | Karr | |
| 7,401,194 B2 | 7/2008 | Jewell | |
| 7,409,523 B2 | 8/2008 | Pudipeddi | |
| 7,424,514 B2 | 9/2008 | Noble et al. | |
| 7,454,592 B1 | 11/2008 | Shah | |
| 7,478,113 B1 | 1/2009 | De Spiegeleer et al. | |
| 7,636,767 B2 * | 12/2009 | Lev-Ran et al. | 709/218 |
| 7,672,981 B1 * | 3/2010 | Faibish et al. | 707/999.204 |
| 8,074,043 B1 * | 12/2011 | Zeis | 711/171 |
| 2001/0045962 A1 | 11/2001 | Lee | |
| 2002/0107877 A1 | 8/2002 | Whiting et al. | |
| 2004/0044707 A1 | 3/2004 | Richard | |
| 2004/0143731 A1 | 7/2004 | Audebert et al. | |
| 2005/0027766 A1 | 2/2005 | Ben | |
| 2005/0065986 A1 * | 3/2005 | Bixby et al. | 707/204 |
| 2005/0198328 A1 | 9/2005 | Lee et al. | |
| 2005/0204108 A1 | 9/2005 | Ofek | |
| 2005/0216813 A1 | 9/2005 | Cutts et al. | |
| 2006/0026219 A1 | 2/2006 | Orenstein et al. | |
| 2006/0271540 A1 | 11/2006 | Williams | |
| 2007/0192548 A1 | 8/2007 | Williams | |
| 2007/0198659 A1 | 8/2007 | Lam | |
| 2007/0250674 A1 | 10/2007 | Fineberg et al. | |
| 2008/0005141 A1 | 1/2008 | Zheng et al. | |
| 2008/0104146 A1 * | 5/2008 | Schwaab et al. | 707/204 |
| 2008/0133561 A1 | 6/2008 | Dubnicki et al. | |
| 2008/0154989 A1 | 6/2008 | Arman | |
| 2008/0228939 A1 | 9/2008 | Samuels et al. | |
| 2008/0243769 A1 | 10/2008 | Arbour et al. | |
| 2008/0243953 A1 | 10/2008 | Wu et al. | |
| 2008/0244204 A1 | 10/2008 | Cremelie et al. | |
| 2009/0013129 A1 * | 1/2009 | Bondurant | 711/115 |
| 2009/0094186 A1 * | 4/2009 | Kan | 707/1 |
| 2009/0132616 A1 * | 5/2009 | Winter et al. | 707/204 |
| 2009/0182789 A1 * | 7/2009 | Sandorfi et al. | 707/204 |
| 2009/0259701 A1 | 10/2009 | Wideman et al. | |
| 2010/0083003 A1 | 4/2010 | Spackman | |
| 2010/0125553 A1 * | 5/2010 | Huang et al. | 707/661 |
| 2010/0174684 A1 * | 7/2010 | Schwaab et al. | 707/655 |
| 2010/0250896 A1 | 9/2010 | Matze | |
| 2010/0257403 A1 | 10/2010 | Virk et al. | |
| 2010/0274982 A1 | 10/2010 | Mehr et al. | |
| 2010/0332452 A1 | 12/2010 | Hsu et al. | |
| 2010/0332456 A1 * | 12/2010 | Prahlad et al. | 707/664 |
| 2012/0059800 A1 * | 3/2012 | Guo | 707/664 |

OTHER PUBLICATIONS

Yang et al.—"DEBAR: A scalable high-performance de-duplication storage system for backup and archiving"—Parallel & Distributed Processing (IPDPS), 2010 IEEE International Symposium on—Apr. 19-23, 2010—pp. 1-12.*

U.S. Appl. No. 11/404,105 entitled Routing, filed Apr. 13, 2006.

U.S. Appl. No. 11/403,379 entitled Parallel Backup, filed Apr. 13, 2006.

U.S. Appl. No. 11/641,389, filed Dec. 18, 2006 entitled "Single Instance Storage".

International Search Report and Written Opinion Application No. PCT/US2011/050101 mailed Feb. 14, 2012.

* cited by examiner

| Reference List 500 | | |
|---|---|---|
| Container | Segment Object | Files |
| 210 | | 241 |
| 210 | | 242 |
| 210 | | 243 |
| 210 | | 244 |
| | 231 | 241 |
| | 231 | 242 |
| | 231 | 243 |
| | 231 | 244 |
| | 232 | 243 |
| | 232 | 244 |
| | 233 | 242 |
| | 233 | 244 |
| | 234 | 241 |
| | 234 | 242 |
| | 234 | 243 |
| | 234 | 244 |
| | 235 | 241 |
| | 235 | 243 |
| | 236 | 241 |
| | 236 | 242 |
| | 237 | 241 |
| | 237 | 242 |
| | 237 | 243 |
| | 238 | 242 |
| | 238 | 243 |
| | 239 | 242 |

Container                                    Files

| Reference List 500 | | |
|---|---|---|
| Container | Segment Object | Files |
| 210 | | 241 |
| 210 | | 242 |
| 210 | | 244 |
| | 231 | 241 |
| | 231 | 242 |
| | 231 | 243 |
| | 231 | 244 |
| | 232 | 243 |
| | 232 | 244 |
| | 233 | 242 |
| | 233 | 244 |
| | 234 | 241 |
| | 234 | 242 |
| | 234 | 243 |
| | 234 | 244 |
| | 235 | 241 |
| | 235 | 243 |
| | 236 | 241 |
| | 236 | 242 |
| | 237 | 241 |
| | 237 | 242 |
| | 237 | 243 |
| | 238 | 242 |
| | 238 | 243 |
| | 239 | 242 |

Container                      Files

| Reference List 500 | | |
|---|---|---|
| Container | Segment Object | Files |
| 210 | | 241 |
| 210 | | 244 |
| | 231 | 241 |
| | 231 | 244 |
| | 232 | 244 |
| | 233 | 244 |
| | 234 | 241 |
| | 234 | 244 |
| | 235 | 241 |
| | 236 | 241 |
| | 237 | 241 |
| | 238 | None |
| | 239 | None |

| Reference List 800A | | |
|---|---|---|
| Container | Segment Object | Backup Transaction |
| 210 | | 250 |
| | 231 | 250 |
| | 232 | 250 |
| | 233 | 250 |
| | 234 | 250 |
| | 235 | 250 |
| | 236 | 250 |
| | 237 | 250 |
| | 238 | 250 |
| | 239 | 250 |

Container      Backups

SYSTEM AND METHOD FOR SCALABLE REFERENCE MANAGEMENT IN A DEDUPLICATION BASED STORAGE SYSTEM

BACKGROUND OF THE INVENTION

1. Field of the Invention

The present invention relates generally to backup storage systems, and in particular to reference lists used to facilitate resource reclamation in deduplication based storage systems.

2. Description of the Related Art

Organizations are accumulating and storing immense amounts of electronic data. As a result, backup storage systems are increasing in size and consuming large quantities of resources. To cope with storing ever increasing amounts of data, deduplication has become an important feature for maximizing storage utilization in backup storage systems. In a typical deduplication system, files are partitioned into data segments and redundant data segments are deleted from the system. Then, the unique data segments are stored as segment objects in the backup storage medium. As the number of stored segment objects increases, the management of the segment objects requires an increasing share of system resources which can impact the overall efficiency and performance of the deduplication system.

A deduplication based system aims to reduce the amount of storage capacity required to store large amounts of data. Deduplication techniques have matured to the point where they can achieve significant reductions in the quantity of data stored. However, while such techniques may reduce the required storage space, the number of segment objects stored in the system may nevertheless continue to increase. As deduplication systems scale up to handle higher data loads, the management and indexing of the segment objects may become an important factor that affects performance of the systems.

Typically, segment objects have a small size, as small as 4 Kilobytes (KB) in some systems. For a system storing 400 Terabytes (TB) of data, with all segment objects of size 4 KB, 100 billion segment objects would be maintained. As storage requirements grow, the increase in the number of segment objects may create unacceptable management overhead. Therefore, a highly scalable management system is needed to efficiently store and manage large quantities of segment objects.

A particularly challenging issue involves reclaiming resources after a file is deleted from the system. When a file is deleted, the segment objects that make up the file cannot simply be deleted as there is the possibility that some other file stored by the system references one or more of those same segment objects. Only if no other files use those segment objects can they be deleted. Some form of management is needed to keep track of the segment objects and all of the files that use the segment objects. There are a variety of techniques used to manage the segment objects and the files that point to them, most of which may work reasonably well when operating on a small scale. However, many of these approaches may not be efficient when dealing with a large number of segment objects.

One technique used to facilitate resource reclamation is reference counting for segment objects. The reference count stores a value indicating how many files point to, or use, that segment. A segment object's reference count is incremented every time it is used by a file, and decremented when the file using the segment is deleted—eventually the segment may be reclaimed when the count drops to zero.

Reference counting has several limitations which make it unsuitable for deduplication. One limitation is that any lost or repeated update will incorrectly change the count. If the count is accidentally reduced, the segment may be deleted while it is still being used by at least one file. If the count is accidentally increased, then the segment may never be deleted even after all of the files using it are deleted from the system.

A further shortcoming of reference counting is that it does not allow for identifying which files use a given segment object. If a segment object gets corrupted, the backup system would need to know which files are using it, so that the file can be requested to recover the corrupted data. However, reference counting does not maintain a listing of which files are using each particular segment object, making recovery of corrupted data more difficult.

Another tool that can be used to facilitate resource reclamation is a reference list. Maintaining a reference list does not suffer from the inherent shortcomings of reference counting. A reference list may have greater immunity to mistaken updates, since the list can be searched to see if an add or remove operation has already been performed. Also, reference lists have the capability to identify which files are using each segment object. However, a reference list is not readily scalable to handle a large number of segment objects. Traditionally, a reference list is managed at a fine level according to each segment object that is stored. As the number of segment objects increases, updating the reference list may take a longer period of time, which may slow down system performance. What is needed is a new method for maintaining a reference list that can efficiently manage large numbers of segment objects.

In view of the above, improved methods and mechanisms for managing reference lists in a deduplication system are desired.

SUMMARY OF THE INVENTION

Various embodiments of methods and mechanisms for efficiently managing reference lists in deduplication based storage systems are contemplated. In one embodiment, the reference list may consist of coarse level entries for each container stored in the backup storage medium. Each file that is made up of at least one segment object stored within a specific container may have an entry in the reference list for that specific container. Entries may be added to or deleted from the reference list as files are added to or deleted from the deduplication based storage system. In another embodiment, the reference list may consist of coarse level entries for containers, and fine level entries for segment objects stored within the containers. The reference list may be managed at a coarse level, such that deletions of files from the storage system may result in the container entries being updated without the segment object entries being updated. As the number of coarse level entries for a particular container decreases, eventually the number will fall below a threshold, at which point the server may switch back to managing the list for that specific container at a fine level. Managing the reference list at a fine level may involve updating segment object entries each time a file is deleted from the system.

In a further embodiment, the reference list may associate each entry with a backup transaction instead of associating each entry with a file. A backup transaction may include all of the files sent by a single client to the deduplication based storage system for a single backup operation. The reference list may consist of coarse level entries for each container stored in the backup storage medium. Each backup transaction that is made up of at least one segment object stored within a specific container may have an entry in the reference list for that specific container. In a still further embodiment, the reference list may have a course level entry for each container that a backup transaction references and a fine level entry for each segment object that a backup transaction references. The reference list may be updated only at the coarse level until the number of coarse level entries for a particular container falls below a threshold, at which point the server may switch back to managing the list for that specific container at a fine level. Organizing the reference list according to backup transactions may further reduce the amount of entries in the list and reduce the processing time required to process the list in response to a backup transaction being added to or deleted from the system.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION

Figure 1:
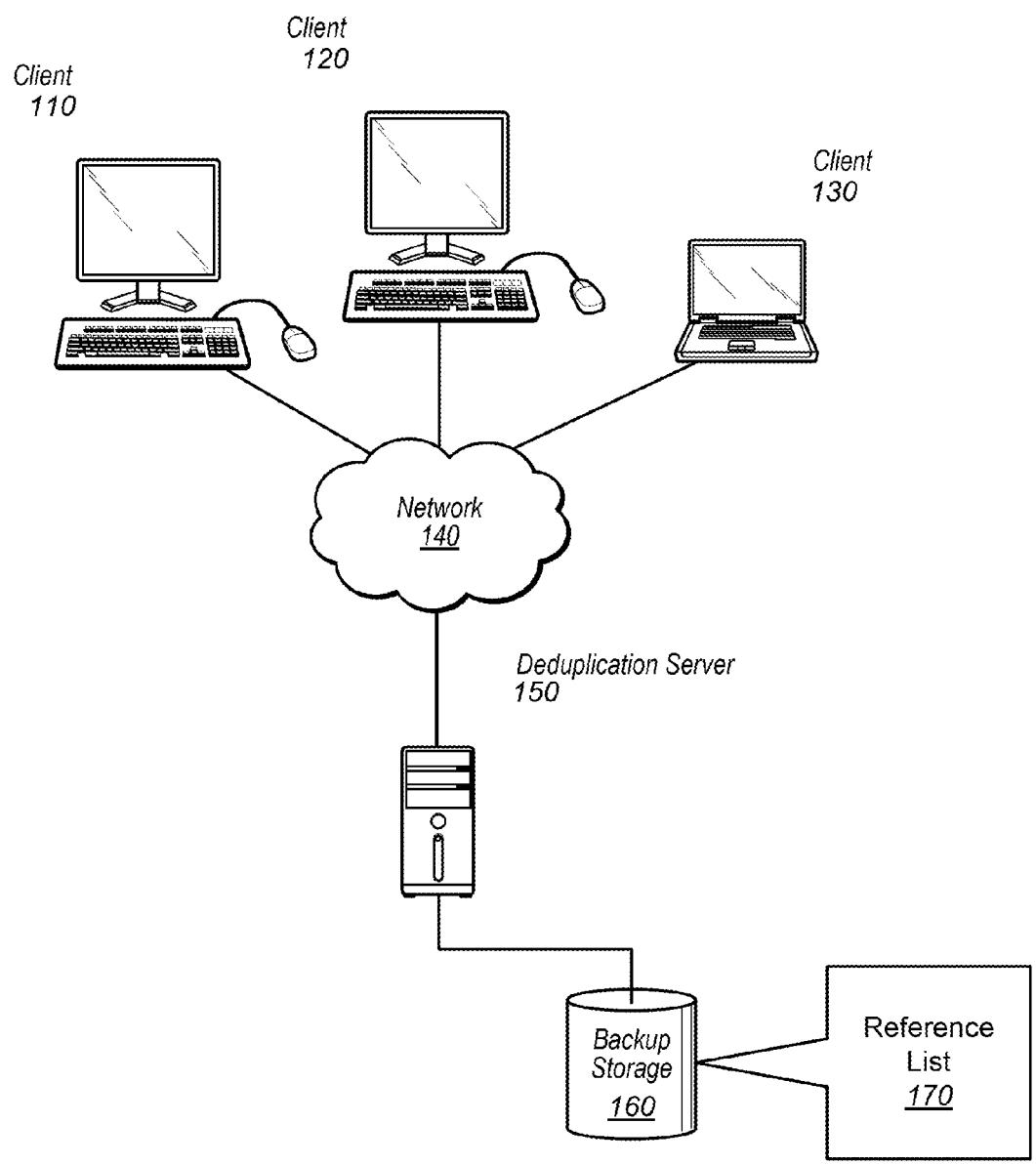
FIG. 1 illustrates one embodiment of a deduplication based storage system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein.

It will be appreciated that for simplicity and clarity of illustration, elements shown in the figures have not necessarily been drawn to scale. For example, the dimensions of some of the elements may be exaggerated relative to other elements. Further, where considered appropriate, reference numerals have been repeated among the figures to indicate corresponding elements.

FIG. 1 illustrates one embodiment of a deduplication based storage system 100. The deduplication based storage system 100 includes clients 110, 120 and 130 that are representative of any number of mobile or stationary clients. While this figure shows the examples of two desktop computers and a laptop computer as clients, other client devices including personal digital assistants, cell phones, smartphones, digital cameras, video cameras, wireless reading devices, and any other types of electronic devices capable of sending and receiving data are possible and are contemplated. As shown in FIG. 1, the clients are connected to a network 140 through which they are also connected to the deduplication server 150. The deduplication server 150 may be used for a variety of different purposes, such as to provide clients 110, 120, and 130 with access to shared data and to back up mission critical data.

In general, the deduplication server 150 may be any type of physical computer or computing device. The deduplication server 150 may include a bus which may interconnect major subsystems or components of the server 150, such as one or more central processor units (CPUs), system memory (random-access memory (RAM), read-only memory (ROM), flash RAM, or the like), input/output (I/O) devices, persistent storage devices such as hard disks, and other peripheral devices typically included in a computer. The deduplication server 150 may have a distributed architecture, or all of its components may be integrated into a single unit. The deduplication server 150 may host an operating system running software processes and applications, and the software may run on the server's CPU(s) and may be stored in the server's memory. Also, the deduplication based storage system 100 may include one or more deduplication servers 150.

The deduplication server 150 may also be connected to backup storage 160, where data from clients 110, 120, and 130 may be stored. Backup storage 160 may include one or more data storage devices of varying types, such as hard disk drives, optical drives, magnetic tape drives, removable disk drives, and others. Backup storage 160 may store the reference list 170, and the reference list 170 may be managed by the deduplication server 150. In another embodiment, the reference list 170 may be stored in the deduplication server's 150 memory. In a further embodiment, the reference list 170 may be managed and stored by an entity other than the deduplication server 150. The reference list 170 may provide a way for the deduplication server 150 to track how many files or backup transactions from clients 110, 120, and 130 are using each of the segment objects stored in the backup storage 160.

In one embodiment, the reference list 170 may contain coarse level entries for the containers stored in the backup storage 160. A container may be a logical entity associated with a variable-sized portion of a file system that includes a number of allocated units of data storage. Also, a container may be mapped to a physical location in the backup storage medium. For each container in the backup storage medium, the reference list 170 may contain a different coarse level entry for each separate file referencing one or more of the plurality of segment objects stored within that particular container. Hence, a container may have a number of coarse level entries in the reference list equal to the number of distinct files that reference at least one segment object within that container. In another embodiment, the reference list may also contain fine level entries for segment objects stored within the containers. For each segment object stored within the container, the reference list may contain a fine level entry for each file referencing that particular segment object. Therefore, the segment object may have a number of fine level entries in the reference list equal to the number of distinct files that reference the segment object.

One or more of the clients coupled to network 140 may also function as a server for other clients. The approaches described herein can be utilized in a variety of networks, including combinations of local area networks (LANs), such as Ethernet networks, Fiber Distributed Data Interface (FDDI) networks, token ring networks, and wireless local area networks (WLANs) based on the Institute of Electrical and Electronics Engineers (IEEE) 802.11 standards (Wi-Fi), and wide area networks (WANs), such as the Internet, cellular data networks, and other data communication networks. The networks served by the approaches described herein may also contain a plurality of backup storage media 160, depending on the unique storage and backup requirements of each specific network. Storage media associated with the backup storage 160 may be implemented in accordance with a variety of storage architectures including, but not limited to, a network-attached storage environment, a storage area network (SAN), and a disk assembly directly attached to the deduplication server 150.

Clients 110, 120, and 130 may send data over the network 140 to the deduplication server 150. The data may be sent in the form of data segments that have been created by partitioning the data stored on the clients 110, 120, and 130 into pieces of one or more predetermined sizes. In various embodiments, clients may include software that assists in backup operations (e.g., a backup agent). In some embodiments, deduplication server 150 may deduplicate received data. Deduplication typically entails determining whether a received data segment is already stored in backup storage 160. If the data segment is already stored in backup storage 160, the received data segment may be discarded and a pointer to the already stored data segment (also referred to as a segment object) used in its place. In this manner, the deduplication server 150 may seek to maintain only a single copy of any segment object in backup storage 160. In other embodiments, the deduplication process may take place prior to the data segments being sent to the deduplication server 150, so that only new data segments may be sent to the deduplication server 150, and all redundant data segments may be deleted at the clients 110, 120, and 130. Deduplication based storage system 100 is shown as including clients and a server, but in alternative embodiments, the functions performed by clients and servers may be performed by peers in a peer-to-peer configuration, or by a combination of clients, servers, and peers.

In other embodiments, the data may also be sent from the clients 110, 120, and 130 to the deduplication server 150 as complete data files, as a plurality of data files copied from an image file or a volume, as a virtual machine disk file (VMDK), as a virtual hard disk (VHD), as a disk image file (.V2I) created by SYMANTEC®BackupExec software products, as a .TAR archive file that further includes a VMDK file for storing the data files as a raw disk partition, or as otherwise may be formatted by the clients 110, 120, and 130.

Figure 2:
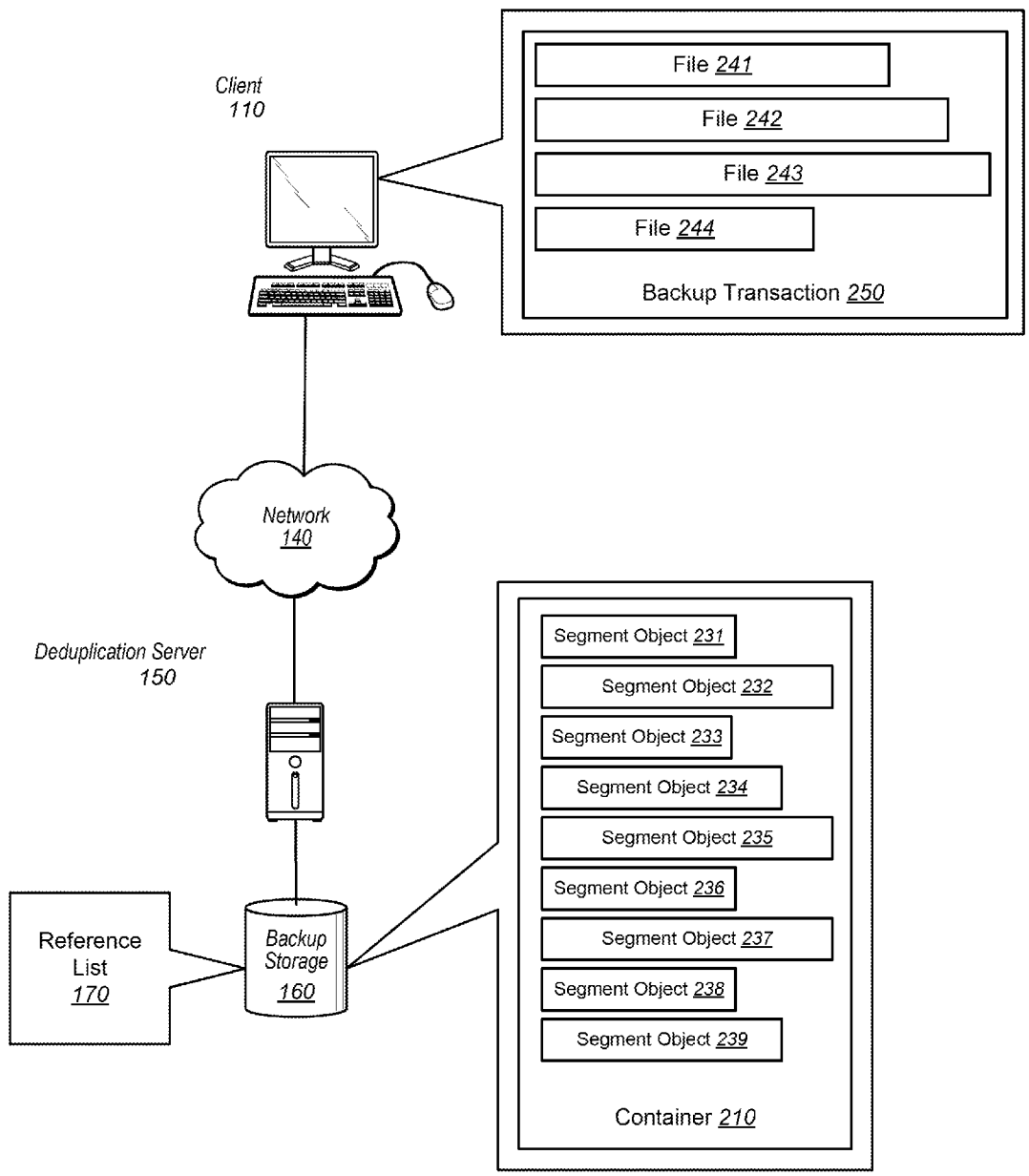
FIG. 2 illustrates one embodiment of a backup transaction being stored as segment objects within a container in backup storage.

Referring now to FIG. 2, a deduplication based storage system is shown. A client 110 is connected to a deduplication server 150 through a network 140. The deduplication server 150 is connected to backup storage 160, which stores a reference list 170 and data from client 110 as segment objects 231-239 within the logical data storage container 210. Any number of segment objects may be stored within a container. In addition, the segment objects 231-239 may be of variable sizes. In another embodiment, segment objects 231-239 may be the same size.

The client 110 has a group of files 241-244 constituting a single backup transaction 250, which the client 110 may send to deduplication server 150 to be stored in backup storage 160. The files 241-244 may be partitioned into data segments of various sizes before or after being sent from the client 110 to the deduplication server 150. Also, the data segments may be deduplicated by the client 110 or by the deduplication server 150. In one embodiment, the backup transaction 250 may comprise all of the files backed up by a single client in a single backup operation. In another embodiment, the backup transaction 250 may comprise a plurality of files from a single client or from a plurality of clients. In a further embodiment, the backup transaction 250 may comprise a plurality of files grouped together based at least in part on the proximity of the segment objects, referenced by the plurality of files, within the backup storage medium 160. Other groupings of files into backup transactions are possible and are contemplated.

The deduplication server 150 may store the deduplicated data segments created from backup transaction 250 in backup storage 160 as segment objects 231-239. The deduplication server 150 may create a container 210 to store the segment objects 231-239. The deduplication server 150 may also create additional containers in the backup storage 160. In one embodiment, the containers may all be the same size. In another embodiment, the containers may be of variable sizes.

Figure 3:
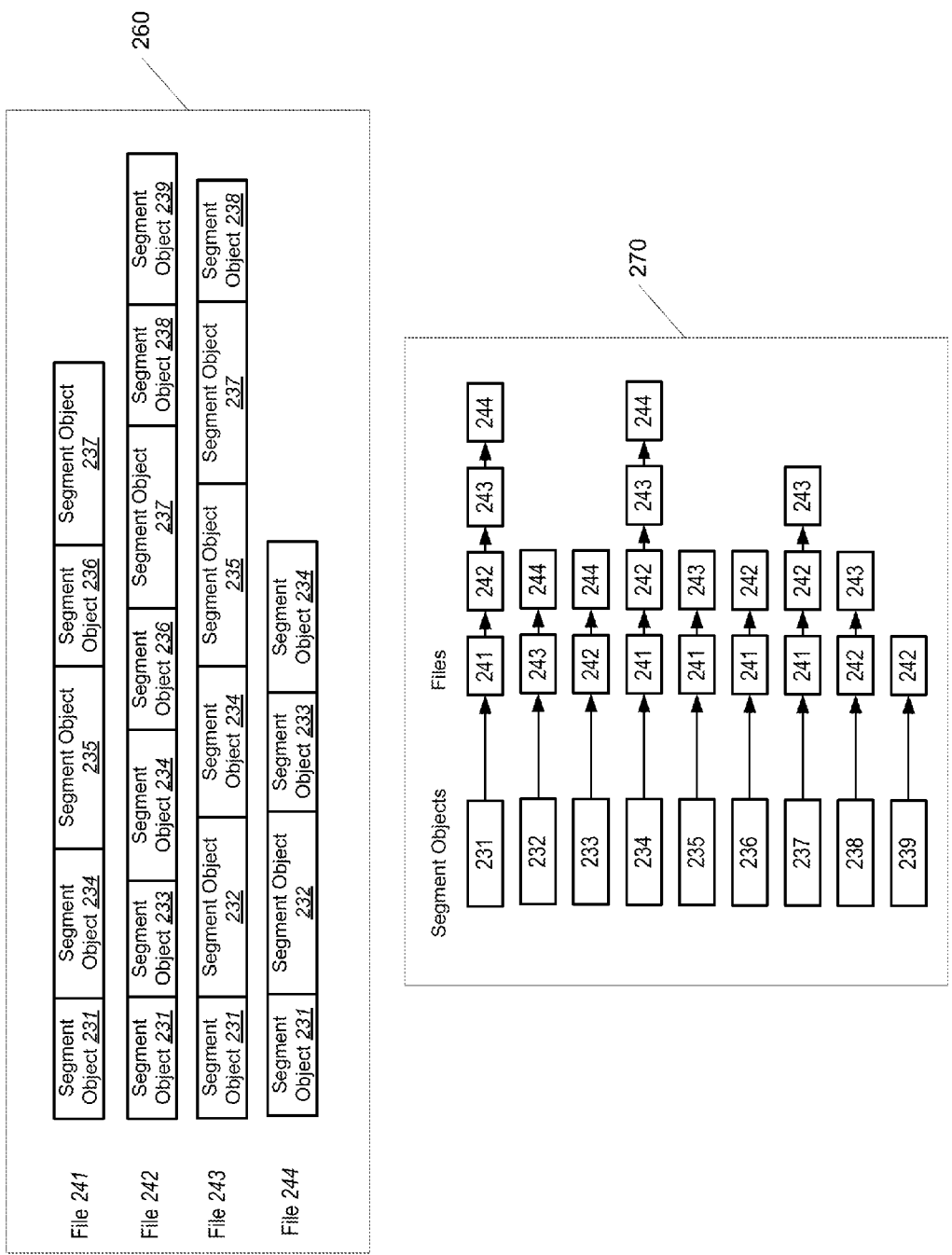
FIG. 3 illustrates one embodiment of files and associated segment object references.

Turning now to FIG. 3, a group of files 260 and associated segment object references 270 are shown. Files 241-244 are shown as they would be reconstructed from segment objects 231-239 in box 260. The files 241-244 from client 110 (of FIG. 2) may be partitioned into data segments, and then the data segments may be stored as segment objects 231-239 in backup storage 160 (of FIG. 2). Each segment object 231-239 may be referenced by more than one file.

In the example shown, file 241 may comprise or be reconstructed from 5 segment objects: 231, 234, 235, 236 and 237. File 242 may be reconstructed from 7 segment objects: 231, 233, 234, 236, 237, 238 and 239. File 243 may be reconstructed from 6 segment objects: 231, 232, 234, 235, 237, and 238. File 244 may be reconstructed from 4 segment objects: 231, 232, 233, and 234. Most of the segment objects are referenced more than once by the four files 241-244, but only one copy of each segment object is stored in backup storage 160 within container 210 (of FIG. 2), reducing the total storage capacity required to store the four files 241-244.

Also shown in FIG. 3 are segment object references 270, with each segment object 231-239 having an associated list of files which reference the segment object. Numerous possible embodiments for the reference lists 270 are possible. For example, in one embodiment a linked list of files may be associated with each segment object identifier. B-tree structures or otherwise may be used to store and maintain the lists 270. Numerous such embodiments are possible and are contemplated. In one embodiment, if a file is deleted, the segment object identifiers 231-239 may be traversed in order to remove those entries/entities that identify the deleted file. As may be appreciated, it may be necessary to traverse many entries in order to completely update the data structure(s) 270. Generally speaking, the overhead associated with such deletions is relatively high. In the following discussion, an alternative approach is described.

Figure 4:
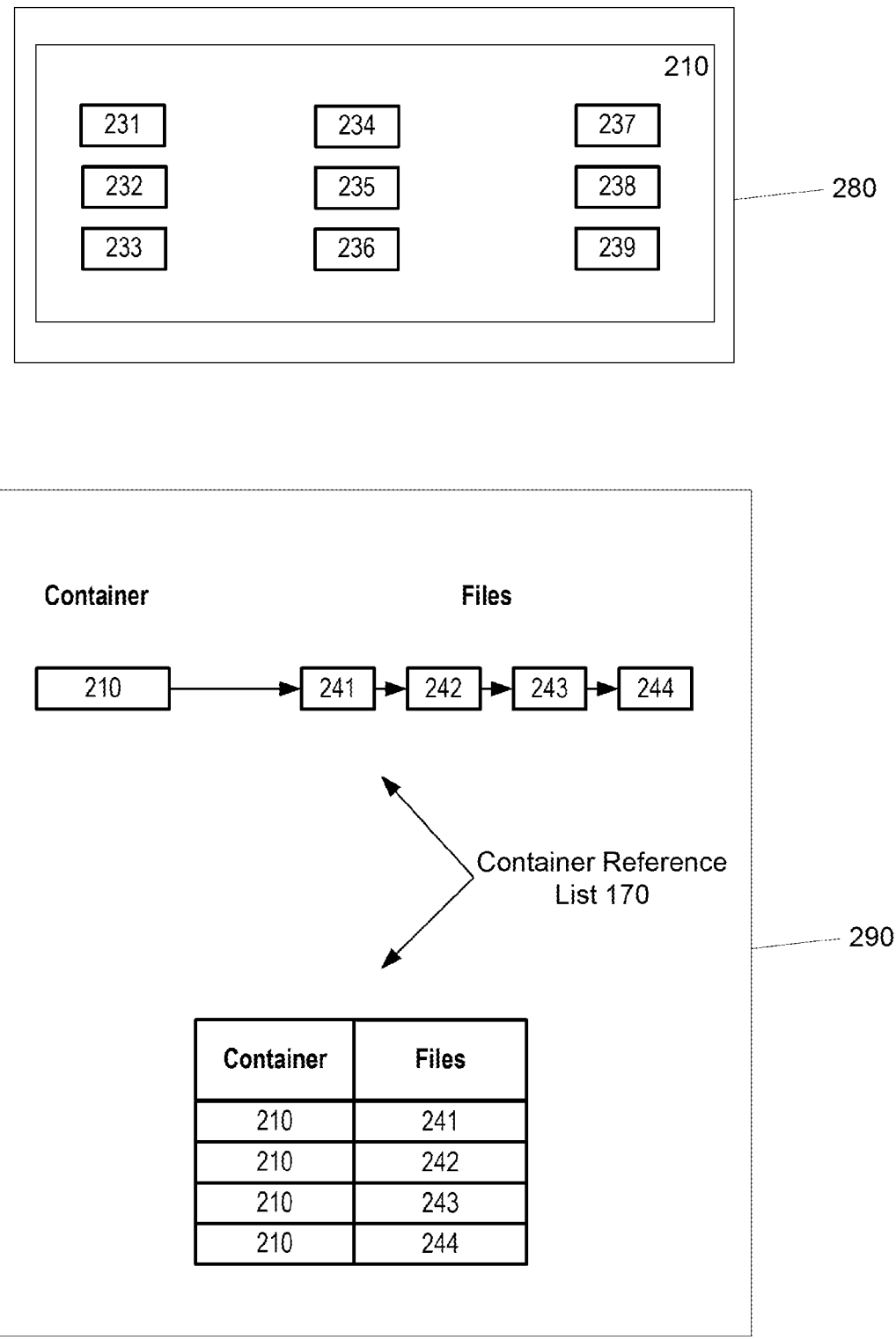
FIG. 4 illustrates a container storing segment objects and two embodiments of a container reference list.

Turning now to FIG. 4, a container 210 containing segment objects 231-239 is shown in box 280. Generally speaking, all segment objects stored within the system may be logically stored within a container. In the simple example shown, container 210 includes six segment objects. However, a container may be configured to include any number of segment objects—hundreds, thousands, or more. Consequently, the number of containers will be a fraction of the number of segment objects. In addition to the above, two embodiments of a container reference list 170 for container 210 (of FIG. 2) are shown in box 290. The first embodiment is shown as a linked list, and the second embodiment is shown as a table.

The container reference list identifies each file that references a segment object within the container. The first embodiment of the container reference list 170 is depicted as a container reference 210 associated with files 241-244, each of which references at least one segment object stored within the container. As with the previously discussed segment object reference list, any suitable data structure may be utilized for maintaining the container reference list. In the first embodiment shown, a linked list type structure is depicted wherein a container identifier 210 has a linked list of file identifiers that reference a segment object within the container 210. As before, B-trees, doubly linked lists, and other data structures may be utilized. Container reference list 170 with headers "container" and "files" includes coarse level entries for the container 210. This container reference list 170 is presented for illustrative purposes only; other ways of implementing a container reference list may be utilized in accordance with the methods and mechanisms described herein. It is also noted that the reference lists described herein may be maintained as one or more lists or structures. In the event multiple lists are maintained, given lists could be associated with particular sets of data, particular types of data, users of the data, particular backups, and so on.

In addition to the linked type structure, more array oriented type structures could be utilized. For example, in one embodiment a dynamically allocable n-dimensional array could be utilized. In the example of FIG. 4, a 2-dimentional array is shown for the container 210, with an entry for each file 241-244. In this manner, there is a coarse level entry in reference list 170 for each file that references at least one of the segment objects stored in the container 210. Four files 241-244 reference segment objects stored in container 210. Consequently, there are four coarse level entries for container 210 in the reference list—one for each of the files referencing segment objects stored within the container.

Figure 5:
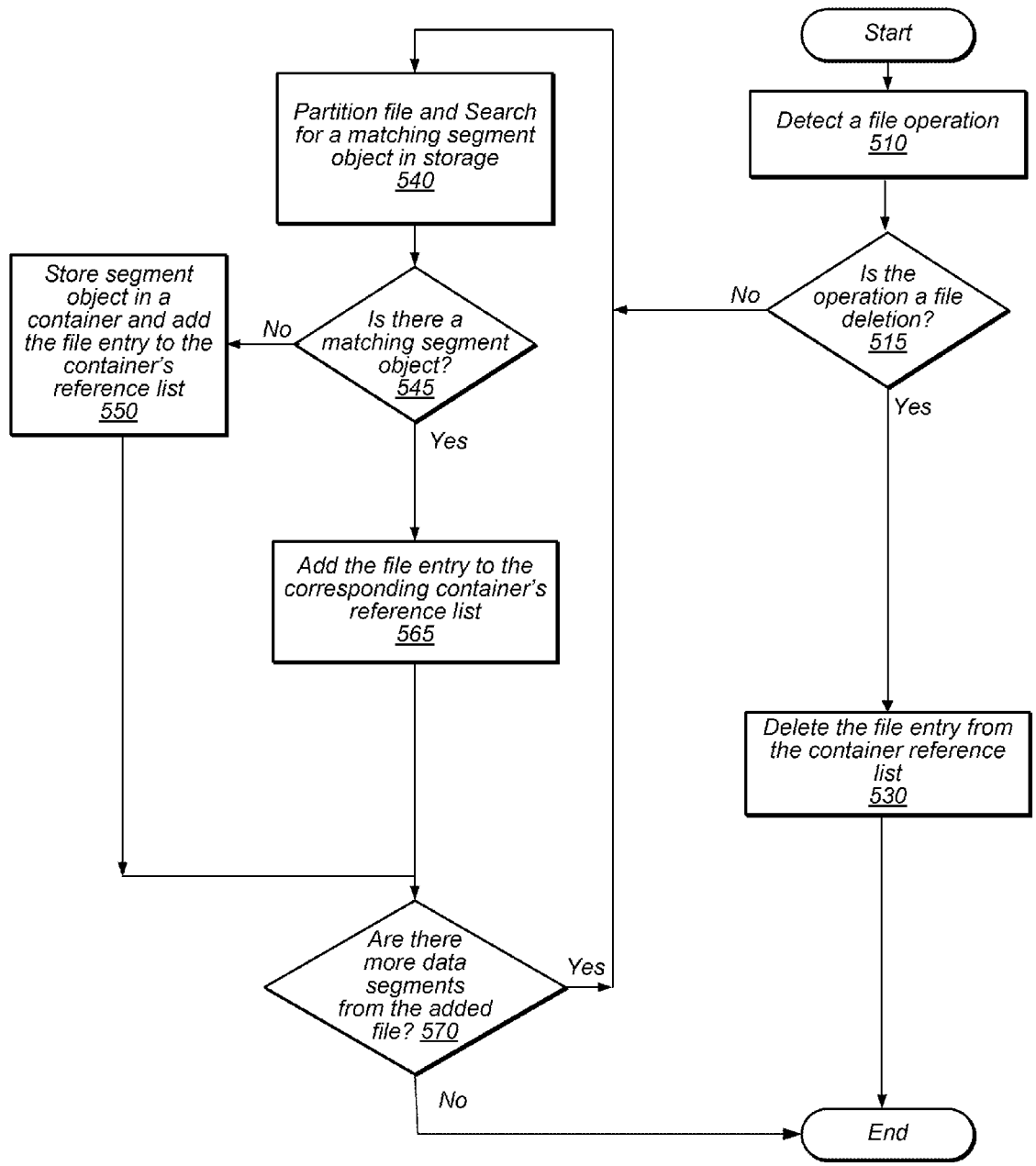
FIG. 5 illustrates one embodiment of a file oriented reference list with coarse and fine level entries.

As noted above, a container reference list as described above will have a fraction of the entries of a segment object reference list in a storage system. Utilizing such a container reference storage list, a method for maintaining the reference lists with much less overhead is now described. FIG. 5 illustrates one embodiment of an overview of a method for maintaining a "file oriented" container reference list. The container list is said to be file oriented as each container has a list of files that reference at least one object in the container. As previously discussed, traversing and maintaining segment object reference lists may entail a relatively high amount of overhead. Particularly when deleting a file, the traversal and updating of segment object reference lists can be relatively time consuming. As an alternative to such an approach, the following method describes an approach where the segment object reference is often ignored. In this manner, overhead associated with maintaining such a list is reduced.

The method of FIG. 5 begins with the detection of a file operation (block 510). If the operation is not a file deletion operation (decision block 515), then the file may be partitioned and a search made for matching objects already stored within the system (block 540)—such as may be the case in a de-duplicating storage system. If there is a matching segment object already stored (decision block 545), an identification of the file is added to the container reference list for the container that includes the matching segment object (block 565), and the process may repeat if there are remaining data segments of the file to process (decision block 570). On the other hand, if there are no matching segment objects already stored (decision block 545), then the data may be stored in the system as a new segment object, and the container reference list updated to include an identification of the file for the container including the new segment object (block 550).

If it turns out that the detected file operation is a file deletion operation (decision block 515), then the identification of the file is removed from the container reference list (block 530). It is noted that in one embodiment the segment object reference list is not updated or maintained at this time. Rather, only the container reference list is updated to reflect the deleted file. As there are far fewer containers than segment objects in the system, and the container reference list includes a fraction of the entries of the segment object reference list, overhead associated with updating the container reference list is much less than that of the segment object list. In the following discussion, a number of examples will be illustrated which show the maintenance of container and segment object reference lists. For ease of illustration, the example will show the lists and entries in an arrayed format. However, as noted above, the actual implementation may be that of a linked structure, tree structures, or otherwise. Additionally, while the discussion may describe coarse and fine entries as part of a single list, it is to be understood that there actually may be multiple lists maintained.

Figure 6:
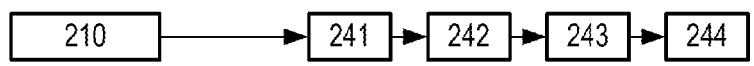
FIG. 6 illustrates one embodiment of a method for maintaining a storage container reference list.

Referring now to FIG. 6, a reference list 500 for container 210 (of FIG. 2) with coarse and fine level entries is shown. As in FIG. 4, both a table and linked list format are shown. The reference list 500 includes coarse level entries for the container 210 which may be in backup storage 160 (of FIG. 2), and fine level entries for the segment objects stored within container 210. In another embodiment, the reference list 500 may contain entries for a plurality of containers stored in backup storage 160. In a further embodiment, the reference list 500 may contain entries for all of the containers stored in backup storage 160. In a still further embodiment, the deduplication server 150 (of FIG. 2) may maintain a separate reference list for each container stored in backup storage 160.

There is a coarse level entry in reference list 500 for each file that references at least one of the segment objects stored in the container 210. Four files 241-244 (of FIG. 3) reference segment objects stored in container 210, and therefore, there are four entries for container 210 in the reference list, one for each of the files pointing to segment objects stored within the container. These entries for container 210 are the coarse level entries of the reference list 500. The entries for each of the segment objects are the fine level entries of the reference list 500. Each segment object may contain a fine level entry for each file that references it. A file may reference a segment object if the segment object may be used to recreate the file during a retrieve or restore operation, or otherwise forms a part of the data that makes up the file.

Segment object 231 contains four fine level entries in reference list 500 for the four files (241-244) that point to it. In addition, segment object 232 contains two fine level entries in the list for files 243 and 244, segment object 233 contains two fine level entries for file 242 and 244, segment object 234 contains four fine level entries for files 241-244, segment object 235 contains two fine level entries for files 241 and 243, segment object 236 contains two fine level entries for files 241 and 242, segment object 237 contains three fine level entries for files 241-243, segment object 238 contains two fine level entries for files 242 and 243, and segment object 239 contains one fine level entry for file 242.

As is shown in FIG. 6, the fine level entries may come after the coarse level entries in the reference list 500. In one embodiment, if the reference list 500 contains entries for more than one container, than the coarse and fine level entries for a first container may be grouped together, followed by the coarse and fine level entries for a second container, and so on for the remainder of the containers. In another embodiment, the coarse level entries for all containers may be grouped together, followed by all of the fine level entries for all containers. Other methods of grouping coarse and fine level entries together and organizing the reference list 500 are possible and are contemplated.

Figure 7:
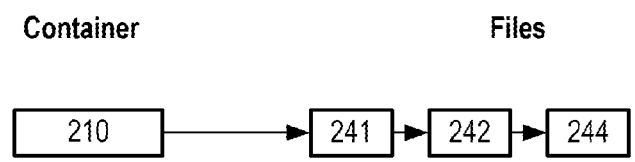
FIG. 7 illustrates one embodiment of a reference list after a first delete operation.

Turning now to FIG. 7, the reference list 500 for container 210 is shown after the list has been updated following the deletion of file 243 from the storage system. Again, both a table and linked list format are shown. As depicted in FIG. 7, the reference list is only being updated for coarse level entries. The threshold for this reference list may be any desired number, such as three. Therefore, when the number of files pointing to the container 210 falls below three, the reference list may switch to updating both the coarse and fine level entries. In another embodiment, the threshold may take on different values. In a further embodiment, the server 150 (from FIG. 1) may determine the value of the threshold based at least in part on the percentage of storage space in the backup storage 160 (from FIG. 1) currently being utilized. In a still further embodiment, the server may determine the value of the threshold based at least in part on the size or number of entries in the reference list. Any desired condition may be used for setting or determining a value of the threshold.

Container 210 has three coarse level entries in the reference list 500 after the entry for file 243 has been deleted. The entries in the reference list 500 for segment objects referenced by file 243 still remain in the list. Since the reference list 500 is only being updated for coarse level entries, the fine level entries are not deleted when a file is deleted. The advantage of updating reference lists at a coarse level is it may speed up the process of updating the lists as there may be fewer entries to process. In the case of reference list 500, when file 243 is deleted only one coarse level entry may be deleted. Also, only four entries (the coarse level entries), may need to be processed to determine if the deleted file references the container. If the reference list 500 had been updated at a fine level, six additional entries may have been deleted, for each of the segment objects pointed to by file 243. Also, all of the fine level entries may have been processed, if the reference list 500 had been updated at a fine level. In a large scale deduplication based storage system storing large numbers of containers and segment objects, updating only the coarse level entries of the reference list(s) may significantly reduce the number of update and processing operations performed following the deletion of a file or group of files.

There may be a disadvantage of updating the reference list at a coarse level. If some of the segment objects within the container are not being used by any files, the reference list may not show this. This may result in unused segment objects consuming storage space that otherwise could be freed and reused. To mitigate against storing unused segment objects, the reference list entries for a specific container may be updated at a fine level when the number of coarse level entries for this container falls below a threshold. When there are only a few coarse level entries for a particular container, there may be a higher probability that segment objects can be reclaimed, and so switching to fine level updating may facilitate faster resource reclamation than utilizing only coarse level updating. Also, when there are a small number of coarse level entries for a particular container, switching to fine level updating may only slightly increase the processing burden of updating the list as compared to if there were a large number of coarse level entries.

After the reference list switches to fine level updating for a specific container, new files may be added to the backup storage system that reference segment objects stored within this particular container. If the number of files referencing the container increases above the threshold, the reference list may switch back to coarse level updating for this container. The reference list may switch back and forth from fine to coarse level updating as many times as the number of coarse level entries for a specific container crosses the threshold in either direction.

Figure 8:
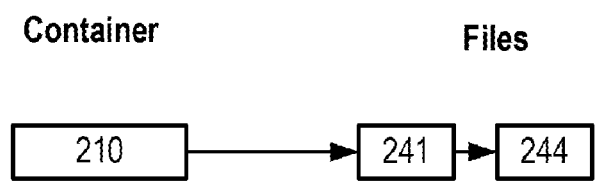
FIG. 8 illustrates one embodiment of a reference list after a second delete operation.

Referring now to FIG. 8, the reference list 500 (both table and linked list format) for container 210 is shown after the file 242 has been deleted from the storage system. After file 242 is deleted, the number of coarse level entries for container 210 is two. Therefore, the reference list 500 may switch to updating both coarse and fine level entries since the number of entries has fallen below the threshold of three. In other embodiments, reference lists may have different threshold values, and the reference lists may switch from coarse level updating to fine level updating at different numbers of coarse level entries.

In FIG. 8, the coarse level entry of container 210 for file 242 may be deleted from the reference list 500. In addition, the segment object (or fine level) entries, may also be updated. All fine level entries for the file 242 may be deleted from the list. Also, because there is no longer a coarse level entry for file 243, which was deleted in a prior operation, all fine entries for file 243 may be deleted from the list. When file 243 was deleted, as shown in FIG. 7, the reference list 500 was in coarse level update mode and only the coarse level entry for file 243 was deleted from the list. After the reference list 500 switches to fine level updating, the fine level entries may need to be updated to match the coarse level entries for the container 210. This allows the list to accurately reflect how many files reference each segment object. As shown in FIG. 8, after deleting all fine level entries associated with files 242 and 243 from reference list 500, segment objects 238 and 239 are not referenced by any files. Therefore, these two segment objects may be deleted and the storage space taken up by these objects reused. The segment objects may be deleted immediately, or they may be marked for deletion and deleted at a later time in a batch operation involving other unused segment objects. In further embodiments, other methods of marking and reclaiming segment objects are possible and contemplated.

When files are added to the backup storage system, the files may be partitioned into data segments identical to already stored segment objects. The reference lists for the containers storing these identical segment objects may be updated. In one embodiment, if the number of coarse level entries is below the threshold, then only the coarse reference list is updated. Should a file be deleted and the coarse level reference list reach the threshold, then the fine reference list may be rebuilt. In this manner, action is only taken for the fine level reference list when needed. If the coarse reference list container rarely reaches the threshold, there is no fine reference update overhead at all. In an alternative embodiment, when files are added to a container, reference lists may be updated at both the fine and coarse level, even if the number of coarse level entries is below the threshold. In such an embodiment, the segment objects referenced by the newly stored files may be stored in containers that are being processed at a coarse level in the reference list. For containers being processed at a coarse level, when a new file is added to the backup storage system, the segment object entries for these containers may still be updated.

In some embodiments, a container may have all of its coarse level entries deleted from the reference list without the fine level entries being updated. This may occur when the reference list for a container only contains coarse level entries. This may also occur when the reference list for a container contains coarse and fine level entries and the threshold is zero. Or this may occur when a group of files is deleted at one time and all of the coarse level entries for a container are deleted in one operation. When all of the coarse level entries are deleted for a particular container, the segment objects for that container may be reclaimed or marked as being ready to be reclaimed, without the fine level entries of the reference list being updated or processed. This may save processing time and overhead by reclaiming the resources used by the segment objects without having to process the fine level entries of the reference list.

Figure 9:
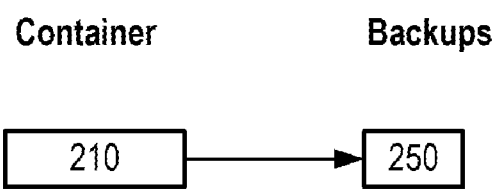
FIG. 9 illustrates one embodiment of a backup oriented reference list with entries for a backup transaction.

Turning now to FIG. 9, a "backup oriented" reference list 800 for container 210 is shown. The container reference list is backup oriented in that each container has a list of backups which reference at least on object in the container. Accordingly, in contrast to the reference list 500 in FIGS. 5-7, reference list 800 contains entries associated with a backup transaction 250. As in the previous examples, both a table and linked list format are shown. Backup transaction 250, as shown in FIG. 2, contains files 241-244. The reference list 800 in FIG. 9 corresponds to the reference list 500 of FIG. 6, before the files 243 and 242 were deleted. The number of entries in the reference list 800 has been reduced by tracking the container 210 and segment objects 231-239 according to a backup transaction instead of according to each individual file. Reducing the size of the reference list 800 may reduce the storage space required to store the list, and may reduce the processing time required to process entries in the list as backup transactions are added to or deleted from the storage system. In one embodiment, the reference list 800 may contain an entry for each instance of a backup transaction referencing a container or segment object. In another embodiment, the deduplication server 150 (of FIG. 2) may organize a plurality of backup transactions into a group of backup transactions, and reference list 800 may contain entries for each instance of a group of backup transactions referencing a container or segment object. In further embodiments, other groupings of files and backup transactions may be used to determine how the reference list 800 records entries. As may be appreciated, while a backup transaction including multiple files is described, other identifiable groupings of files could be used as well.

In addition, the coarse level entries of a reference list may correspond to more than one container. For example, in one embodiment, a plurality of containers may be grouped together. This plurality of containers may store data from one backup transaction. Or, the plurality of containers may be chosen and grouped together based on other factors. The reference list may be organized such that the coarse level entries correspond to a plurality of containers instead of to a single container. Organizing the reference list in this way may result in a smaller reference list with fewer entries and may result in faster update processing when files or backup transactions are added to or deleted from the system.

Figure 10:
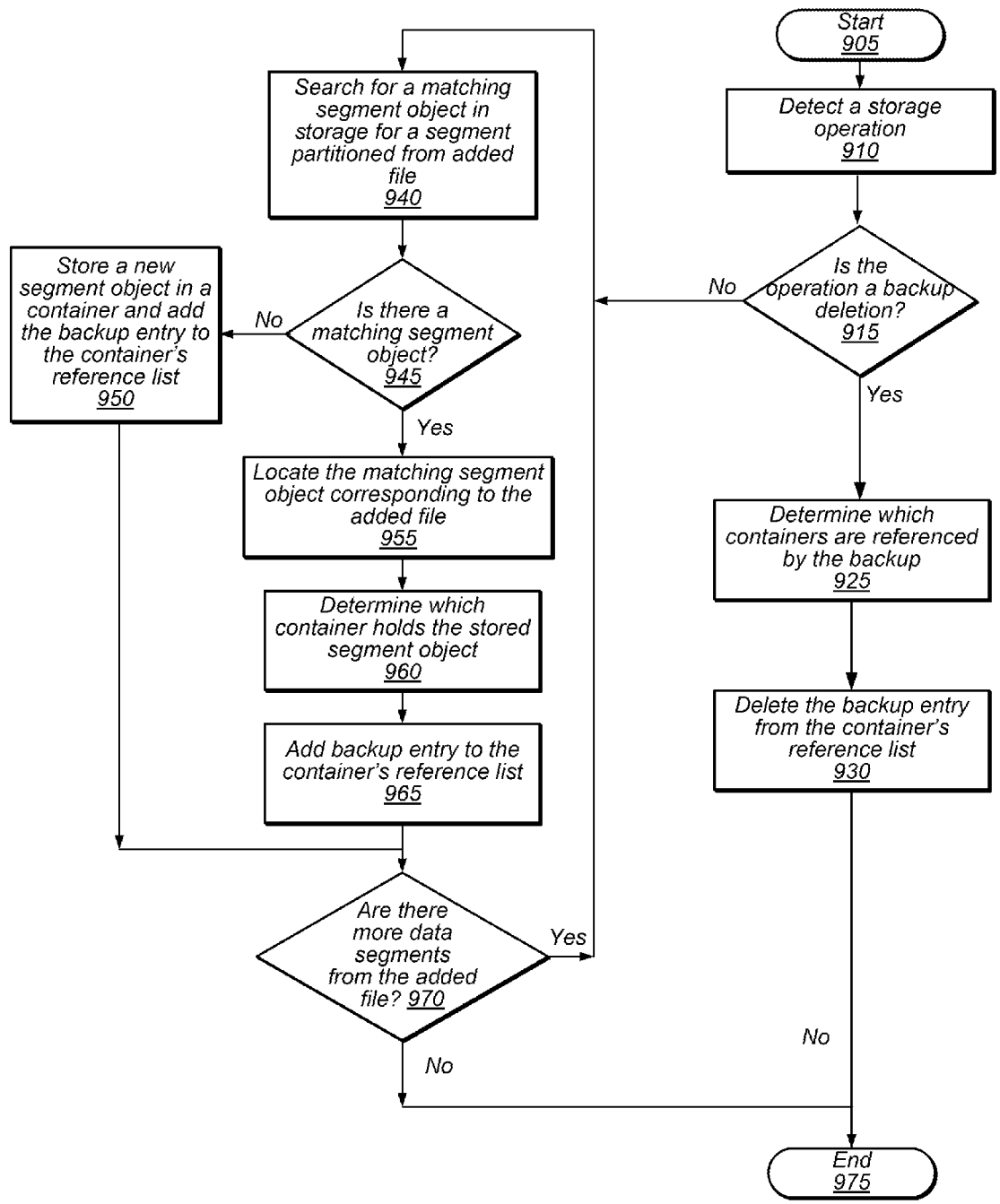
FIG. 10 is a generalized flow diagram illustrating one embodiment of a method to update a reference list following a file add or delete operation.

Turning now to FIG. 10, an embodiment of a method for maintaining a backup oriented reference list is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

The method of FIG. 10 starts in block 905, and then storage operation may be detected in block 910. As the present figure is generally discussing backup operations, the storage operation may be performing a new backup or deleting a previous backup. In conditional block 915, if the operation is determined to be deletion of a backup, then it may be determined which containers of the container reference list include an identification of the backup being deleted (block 925). Then, the entries for the deleted backup in the container's reference list may be deleted (block 930).

If the detected operation is a new backup (conditional block 915), then for each file being added a search may be conducted for a matching segment object in storage identical to a data segment partitioned from the added file (block 940). If there is a matching segment object (conditional block 945), then the matching segment object may be located (block 955). If there is not a matching segment object (conditional block 945), then a new segment object (corresponding to the data segment from the added file) may be stored in a container and a file entry may be added to the container's reference list (block 950).

After the matching segment object is located (block 955), it may be determined which container holds the matching segment object (block 960). Next, an entry for the backup transaction corresponding to the new file may be added to the container's reference list (block 965). In the event the backup transaction already has an entry for the container, a new entry may not be needed. If there are more data segments from the added file (conditional block 970), then the method may return to block 940 to search for matching segment objects. If there are no more data segments from the added file (conditional block 970), then the method may end in block 975.

While embodiments for both file oriented and backup oriented container reference lists have been discussed, in various embodiments, combinations of such embodiments, included segment object reference lists, may be maintained simultaneously. In such embodiments, various conditions may be utilized to determine whether and which reference list to update in a given situation.

Figure 11:
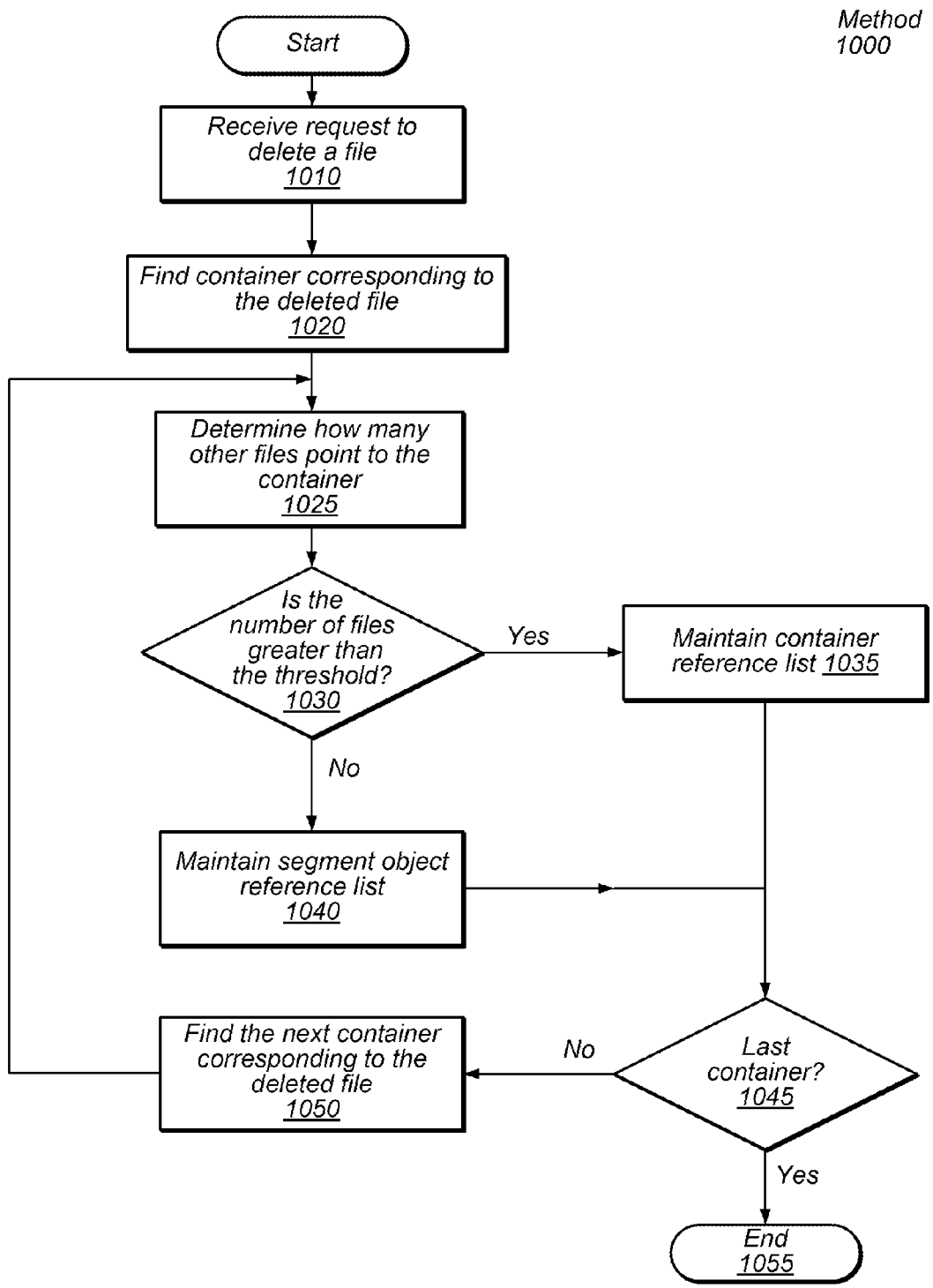
FIG. 11 is a generalized flow diagram illustrating one embodiment of a method to update the reference list.

Referring now to FIG. 11, one embodiment of a hybrid approach based upon the above described methods and mechanisms is shown. In the example, a hybrid between a container reference list and a segment object reference list is described. The method 1000 illustrates one embodiment of a method for determining whether to maintain a container reference list or a segment object reference list. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In the following discussion, a file oriented container reference list is used for purposes of discussion—similar to that discussed in FIG. 5. However, the method may also be applied in a backup oriented container reference list. The method 1000 shown begins with a request to delete a file in block 1010. In block 1020, the deduplication server (or other component) identifies a container referenced by the deleted file (i.e., the file comprises a segment object that is stored in the container). Having identified the container, the deduplication server may then determine how many other files reference the container (block 1025). If the number of files is greater than a given threshold (conditional block 1030), then the deduplication server may maintain the container reference list and delete an identification of the deleted file form the container reference list (block 1035). Deletion of entries may be as described in either FIG. 5 or FIG. 10. In the case of a file oriented container reference list, an identification of the deleted file may be removed from the container reference list for that file. In the case of a backup oriented container reference list, an identification of the deleted backup may be removed from the container reference list.

If the number of files for a given container in the container reference list is less than the threshold (conditional block 1030), then the deduplication server may maintain the segment object reference list and delete the entries corresponding to the deleted file from the segment object reference list (block 1040). In one embodiment, when switching from maintaining the container reference list to maintaining the segment object reference list, the segment object reference list entries corresponding to the identified container may not yet exist. For example, if only the container reference list is being maintained during addition of files, then no corresponding segment object reference list is being maintained. Consequently, if there are still files referencing a given container when a switch to segment object reference list maintenance is made for that container, then the segment object reference list entries for that container do not yet exist. In such a case, the segment object reference list for that container would need to be created. In one embodiment, creation of these segment object reference list entries may occur at the time the decision is made to maintain the segment object reference list (block 104). Next, the deduplication server may determine if this container was the last container referenced by the deleted file (conditional block 1045). If this was the last container pointed to by the deleted file (conditional block 1045), then the method may end in block 1055. If this was not the last container pointed to by the deleted file (conditional block 1045), then the method may find the next container pointed to by the deleted file (block 1050). Next, the server may return to block 1025 to determine how many other files point to the next container.

It is noted that the above-described embodiments may comprise software. In such an embodiment, program instructions and/or a database (both of which may be referred to as "instructions") that represent the described systems and/or methods may be stored on a computer readable storage medium. Generally speaking, a computer readable storage medium may include any storage media accessible by a computer during use to provide instructions and/or data to the computer. For example, a computer readable storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM)), ROM, Flash memory, non-volatile memory (e.g. Flash memory) accessible via a peripheral interface such as the USB interface, etc. Storage media may include micro-electro-mechanical systems (MEMS), as well as storage media accessible via a communication medium such as a network and/or a wireless link.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although several embodiments of approaches have been shown and described, it will be apparent to those of ordinary skill in the art that a number of changes, modifications, or alterations to the approaches as described may be made. Changes, modifications, and alterations should therefore be seen as within the scope of the methods and mechanisms described herein. It should also be emphasized that the above-described embodiments are only non-limiting examples of implementations.

What is claimed is:

1. A system for managing data storage, comprising:
a storage device configured to store file data as a plurality of storage objects in a plurality of storage containers, each of said storage containers being configured to store a plurality of said storage objects, the storage objects representing a partitioned portion of a file;
a storage container reference list, wherein for each of the storage containers the storage container reference list identifies which files of a plurality of files reference a storage object within a given storage container; and
a server, wherein in response to (1) detecting deletion of a given file that references an object within a particular storage container of the storage containers, and (2) determining a number of files referencing the particular container has not fallen to a threshold level, the server is configured to update a storage container reference list of the particular container by removing from the storage container reference list an identification of the given file;
wherein subsets of the plurality of files are grouped into backups, and wherein for each of the storage containers the storage container reference list identifies which backups of the backups include a file that reference a segment object within the given storage container.

2. The system as recited in claim 1, wherein the server is further configured to maintain a segment object reference list, wherein for a given segment object stored in the storage device, the segment object reference list identifies which files of the plurality of files reference the given segment object.

3. The system as recited in claim 2, wherein in response to determining a number of files referencing the particular container has fallen to the threshold level, the server is configured to update the segment object reference list instead of the container reference list responsive to detecting the file deletion.

4. The system as recited in claim 3, wherein when updating the segment object reference list, the server is configured to delete from the segment object reference list entries for segment objects referenced by the given file.

5. The system as recited in claim 3, wherein the server is further configured to determine a value of the threshold based at least in part on storage utilization of the storage device and a size of the storage container reference list.

6. The system as recited in claim 2, wherein in response to detecting said deletion and determining a number of files references the particular container has not fallen to a threshold level, the server does not update the segment object reference list.

7. The system as recited in claim 1, wherein the storage container reference list includes entries associated with a group of containers at a coarse level, with a separate coarse level entry for each file that references at least one segment object stored within said group of containers.

8. A computer implemented method comprising:
storing in a storage device a plurality of storage objects in a plurality of storage containers, each of said storage containers being configured to store a plurality of said storage objects, the storage objects representing a partitioned portion of a file;
maintaining a storage container reference list, wherein for each of the storage containers the storage container reference list identifies which files of a plurality of files reference a storage object within a given storage container; and
removing from the storage container reference list an identification of the given file, in response to (1) detecting deletion of a given file that references an object within a particular storage container of the storage containers and (2) determining a number of files referencing the particular container has not fallen to a threshold level;
wherein subsets of the plurality of files are grouped into backups, and wherein for each of the storage containers the storage container reference list identifies which backups of the backups include a file that reference a segment object within the given storage container.

9. The method as recited in claim 8, further comprising maintaining a segment object reference list, wherein for a given segment object stored in the storage device, the segment object reference list identifies which files of the plurality of files reference the given segment object.

10. The method as recited in claim 9, wherein in response to determining a number of files referencing the particular container has fallen to the threshold level, the method comprises updating the segment object reference list instead of the container reference list responsive to detecting the file deletion.

11. The method as recited in claim 10, wherein when updating the segment object reference list, the method comprises deleting from the segment object reference list entries for segment objects referenced by the given file.

12. The method as recited in claim 9, wherein in response to detecting said deletion and determining a number of files references the particular container has not fallen to a threshold level, the method does not update the segment object reference list.

13. The method as recited in claim 8, wherein the storage container reference list includes entries associated with a group of containers at a coarse level, with a separate coarse level entry for each file that references at least one segment object stored within said group of containers.

14. A computer readable storage medium comprising program instructions, wherein when executed the program instructions are operable to:
store in a storage device a plurality of storage objects in a plurality of storage containers, each of said storage containers being configured to store a plurality of said storage objects, the storage objects representing a partitioned portion of a file;
maintain a storage container reference list, wherein for each of the storage containers the storage container reference list identifies which files of a plurality of files reference a storage object within a given storage container; and
remove from the storage container reference list an identification of the given file, in response to (1) detecting deletion of a given file that references an object within a particular storage container of the storage containers and (2) determining a number of files referencing the particular container has not fallen to a threshold level;
wherein subsets of the plurality of files are grouped into backups, and wherein for each of the storage containers the storage container reference list identifies which backups of the backups include a file that reference a segment object within the given storage container.

15. The computer readable storage medium as recited in claim 14, wherein when executed the program instructions are further operable to maintain a segment object reference list, wherein for a given segment object stored in the storage device, the segment object reference list identifies which files of the plurality of files reference the given segment object.

16. The computer readable storage medium as recited in claim 15, wherein in response to determining a number of files referencing the particular container has fallen to the threshold level, the program instructions are further operable to update the segment object reference list instead of the container reference list responsive to detecting the file deletion.

17. The computer readable storage medium as recited in claim 14, wherein in response to detecting said deletion and determining the number of files referencing the given container has not fallen to said threshold, the segment object reference list is not updated.

18. A system for managing data storage, comprising:
a storage device configured to store file data as a plurality of storage objects in a plurality of storage containers, each of said storage containers being configured to store a plurality of said storage objects, the storage objects representing a partitioned portion of a file;
a storage container reference list, wherein for each of the storage containers the storage container reference list identifies which files of a plurality of files reference a storage object within a given storage container; and
a server, wherein in response to (1) detecting deletion of a given file that references an object within a particular storage container of the storage containers, and (2) determining a number of files referencing the particular container has not fallen to a threshold level, the server is configured to update a storage container reference list of the particular container by removing from the storage container reference list an identification of the given file;
wherein the storage container reference list includes entries associated with a group of containers at a coarse level, with a separate coarse level entry for each file that references at least one segment object stored within said group of containers.

19. A computer implemented method comprising:
storing in a storage device a plurality of storage objects in a plurality of storage containers, each of said storage containers being configured to store a plurality of said storage objects, the storage objects representing a partitioned portion of a file;
maintaining a storage container reference list, wherein for each of the storage containers the storage container reference list identifies which files of a plurality of files reference a storage object within a given storage container; and removing from the storage container reference list an identification of the given file, in response to (1) detecting deletion of a given file that references an object within a particular storage container of the storage containers and (2) determining a number of files referencing the particular container has not fallen to a threshold level;

wherein the storage container reference list includes entries associated with a group of containers at a coarse level, with a separate coarse level entry for each file that references at least one segment object stored within said group of containers.

20. A computer readable storage medium comprising program instructions, wherein when executed the program instructions are operable to:

store in a storage device a plurality of storage objects in a plurality of storage containers, each of said storage containers being configured to store a plurality of said storage objects, the storage objects representing a partitioned portion of a file;

maintain a storage container reference list, wherein for each of the storage containers the storage container reference list identifies which files of a plurality of files reference a storage object within a given storage container; and remove from the storage container reference list an identification of the given file, in response to (1) detecting deletion of a given file that references an object within a particular storage container of the storage containers and (2) determining a number of files referencing the particular container has not fallen to a threshold level;

wherein the storage container reference list includes entries associated with a group of containers at a coarse level, with a separate coarse level entry for each file that references at least one segment object stored within said group of containers.

* * * * *